United States Patent [19]
Hedden et al.

[11] Patent Number: 5,494,761
[45] Date of Patent: * Feb. 27, 1996

[54] X-RAY INTENSIFYING SCREENS WITH MIXED MOROPHOLOGY PHOSPHORS

[75] Inventors: David B. Hedden, Sayre; William Zegarski, Towanda, both of Pa.

[73] Assignee: E. I. Du Pont de Nemours and Company, Wilmington, Del.

[*] Notice: The portion of the term of this patent subsequent to Oct. 5, 2010, has been disclaimed.

[21] Appl. No.: 128,953

[22] Filed: Sep. 29, 1993

Related U.S. Application Data

[63] Continuation of Ser. No. 789,484, Nov. 12, 1991, Pat. No. 5,250,365, which is a continuation-in-part of Ser. No. 627,991, Dec. 17, 1990, Pat. No. 5,064,729, and Ser. No. 627,993, Dec. 17, 1990, Pat. No. 5,141,673.

[51] Int. Cl.$^6$ ............................... G03C 5/17; G21K 4/00
[52] U.S. Cl. .................. 428/690; 428/917; 252/301.4 H; 252/301.4 R; 252/301.5; 252/301.4 F; 250/483.1
[58] Field of Search ....................... 428/690, 917; 252/301.4 H, 301.4 R, 301.5, 301.4 F, 304.4 R; 250/483.1

[56] References Cited

U.S. PATENT DOCUMENTS

| | | | |
|---|---|---|---|
| 3,621,340 | 11/1971 | Singh et al. | 313/108 D |
| 3,670,194 | 6/1972 | Thornton, Jr. et al. | 313/109 |
| 4,011,455 | 3/1977 | Waller et al. | 250/486 |
| 4,042,527 | 8/1977 | Kano et al. | 262/301.4 |
| 4,088,894 | 5/1978 | Rabatin | 250/483 |
| 4,225,653 | 9/1980 | Brixner | 428/539 |
| 4,316,092 | 2/1982 | Rabatin | 250/4831 |
| 4,387,141 | 6/1983 | Patten | 428/690 |
| 5,064,729 | 11/1991 | Zegarski | 428/690 |

*Primary Examiner*—Charles R. Nold

[57] ABSTRACT

An X-ray evaluation apparatus of a film in cooperation with an intensifying screen with improved resolution at a constant coating weight and speed comprises a phosphor-binder layer coated on a support, wherein the phosphor comprises a rare earth tantalate phosphor in which 5–80% has a tabular morphology with an average aspect ratio of about 2:1 and the remainder of the phosphor has a polyhedral morphology.

9 Claims, 6 Drawing Sheets

X-RAY INTENSIFYING SCREENS WITH MIXED MOROPHOLOGY PHOSPHORS

CROSS REFERENCE TO RELATED APPLICATION

This application is a continuation of Ser. No. 07/789,484 filed Nov. 12, 1991, now U.S. Pat. No. 5,250,365 which is a continuation-in-part of U.S. application Ser. No. 07/627,991, filed Dec. 17, 1990, now U.S. Pat. No. 5,064,729 and a continuation-in-part of U.S. application Ser. No. 07/627,993, filed Dec. 17, 1990, now U.S. Pat. No. 5,141,673.

FIELD OF INVENTION

This invention relates to luminescent phosphor materials and particularly to luminescent materials useful in the preparation of X-ray intensifying screens. More particularly this invention relates to an X-ray intensifying screen wherein the luminescent material comprises a mixture of tabular and polyhedral shaped tantalate phosphors having the monoclinic M' structure.

BACKGROUND OF THE INVENTION

X-ray intensifying screens are generally used in conjunction with silver halide photographic films and serve to enhance the image formed on that film. Phosphors, which are the active component of X-ray screens, are legion in number and include the tungstates, the oxysulfides and oxybromides, among others.

Particularly efficient phosphors in an X-ray intensifying screen, are the tantalates taught in Brixner U.S. Pat. No. 4,225,623, the disclosure of which is incorporated herein by reference. These phosphors are based on yttrium, lutetium and gadolinium tantalates of the M' monoclinic structure. The host tantalate may be activated with niobium or with rare earths, such as terbium and thulium, for example, as well described in the aforementioned patent. Since these phosphors have a high X-ray stopping power, they are widely used in intensifying screens and the methods for their preparation include the mixing of ingredients followed by firing to form the phosphor crystal lattice.

During the firing step, it is often beneficial to use a flux which usually forms a partial liquid at the elevated firing temperatures. Thus, the flux can be thought of as a fluid in which the various phosphor precursors react to form the phosphor. These fluxes are generally alkali metal or alkaline earth salts, including $Li_2SO_4$, pure $LiCl$, $BaCl_2$, $SrCl_2$ and mixtures of these salts, for example.

In the process of preparing tantalate phosphors, it has been found that alkali halides and combinations of alkali halides and alkaline earth halides are suitable for use as fluxes in increasing the reaction rate between oxides of yttrium and tantalum. A problem associated with the use of halides is their low melting points and the reactivity of these compounds with materials of construction used in furnaces and crucibles which contain the reaction mixture. The reaction between yttrium oxide and oxides of tantalum and niobium is best run at temperatures above 1200° C. At these temperatures, lithium and sodium chlorides are within 250° C. of their boiling points. Consequently, significant amounts of the chlorides are present as highly reactive gases in the furnace and the crucibles holding the reaction mixture. This condition can lead to shortened equipment lifetimes. Alkali sulfates are more stable in this regard but give phosphor with lower efficiency due to the effect of flux decomposition products. Lithium and sodium sulfates decompose, at the high reaction temperature used to obtain the phosphor, to lithium and sodium oxide, respectively, and oxides of sulfur. Lithium oxide is very reactive and can form lithium tantalate and/or lithium niobate in the phosphor oxide mixture. Lithium tantalate and niobate, however, are not as efficient as, for example, the yttrium tantalate compounds when used as X-ray phosphors. Thus, there is a need to find better flux systems for the preparation of X-ray intensifying phosphors.

The use of a rare earth oxide phosphor containing alkali metal silicates and germanates, is also known. In this particular case, however, the silicate is used as an integral mixture with the phosphor itself and it is reported that the brightness of the rare earth oxide phosphor is increased. The phosphors produced by this technique are not X-ray intensifying phosphors, but are red-emitting phosphors used in cathode ray tubes, for example.

It has been found that the effect of these decomposition products can be minimized by adding small amounts of a sequesterant such as alkali metal metasilicate, e.g., lithium metasilicate, etc., to the flux which reacts with the alkali oxide and produce lithium orthosilicate. It has also been found that tantalate phosphors with very high efficiency can be produced while minimizing effects of flux and decomposition products by combining the stable sulfates with the reactive halides in the presence of small amounts of a sequesterant compound.

The phosphors typically used in X-ray intensifying preparation are a crystalline material with a multifaceted, or polyhedral, shape. For the monoclinic M' tantalate phosphors in particular, polyhedral crystals are used exclusively in the prior art. X-ray intensifying screens utilizing a mixtures of various sized polyhedral phosphor particles are known in the art, as exemplified in Rabatin, U.S. Pat. No. 4,088,894.

It is also known to use mixtures of different polyhedral phosphors, as exemplified by Kano et.al., U.S. Pat. No. 4,042,527; Waller et.al., No. 4,011,455; Singh et.al., No. 3,621,340; Thornton, No. 3,670,194 and Patten, No. 4,387,141. These references all disclose mixtures of different polyhedral morphology phosphors for adjusting various components of light output based on competition for excitation source.

There is an ongoing need in the art to improve the resolution for a given phosphor without affecting the speed of the eventual X-ray intensifying screen formed with the phosphor. Screen speed is typically directly related to coating weight, whereby an increase in phosphor coating weight results in a higher speed screen. Unfortunately, as well known in the art, an increase in phosphor coating weight also increases light spread within the phosphor layer, thereby decreasing resolution.

It has now been found that an X-ray intensifying screen having improved resolution at a constant speed and coating weight results when a mixture of tabular and polyhedral shaped tantalate phosphor crystals are used therein.

SUMMARY OF THE INVENTION

This invention provides an X-ray intensifying screen with improved image quality comprising a phosphor-binder layer coated on a support, said phosphor-binder layer comprising a binder and a phosphor dispersed therein, said phosphor having the monoclinic M' structure and selected from the group consisting of:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;
(i) a solid solution of at least two of (f), (g) and (h);
(j) any of (a) to (i) wherein up to 45 mole percent of the yttrium, lutetium or gadolinium is replaced by lanthanum;
(k) any of (a) to (i) wherein up to 15 mole percent the yttrium, lutetium or gadolinium is replaced by ytterbium; and
(l) any of (a), (b), (c), (d) and (e) wherein up to 15 mole percent of the yttrium or lutetium is replace by gadolinium; wherein about 5–80% of said phosphor has a tabular morphology with an average aspect ratio of at least 2:1 and the remainder of the phosphor has a polyhedral morphology.

DETAILED DESCRIPTION OF THE INVENTION

Figure 1:
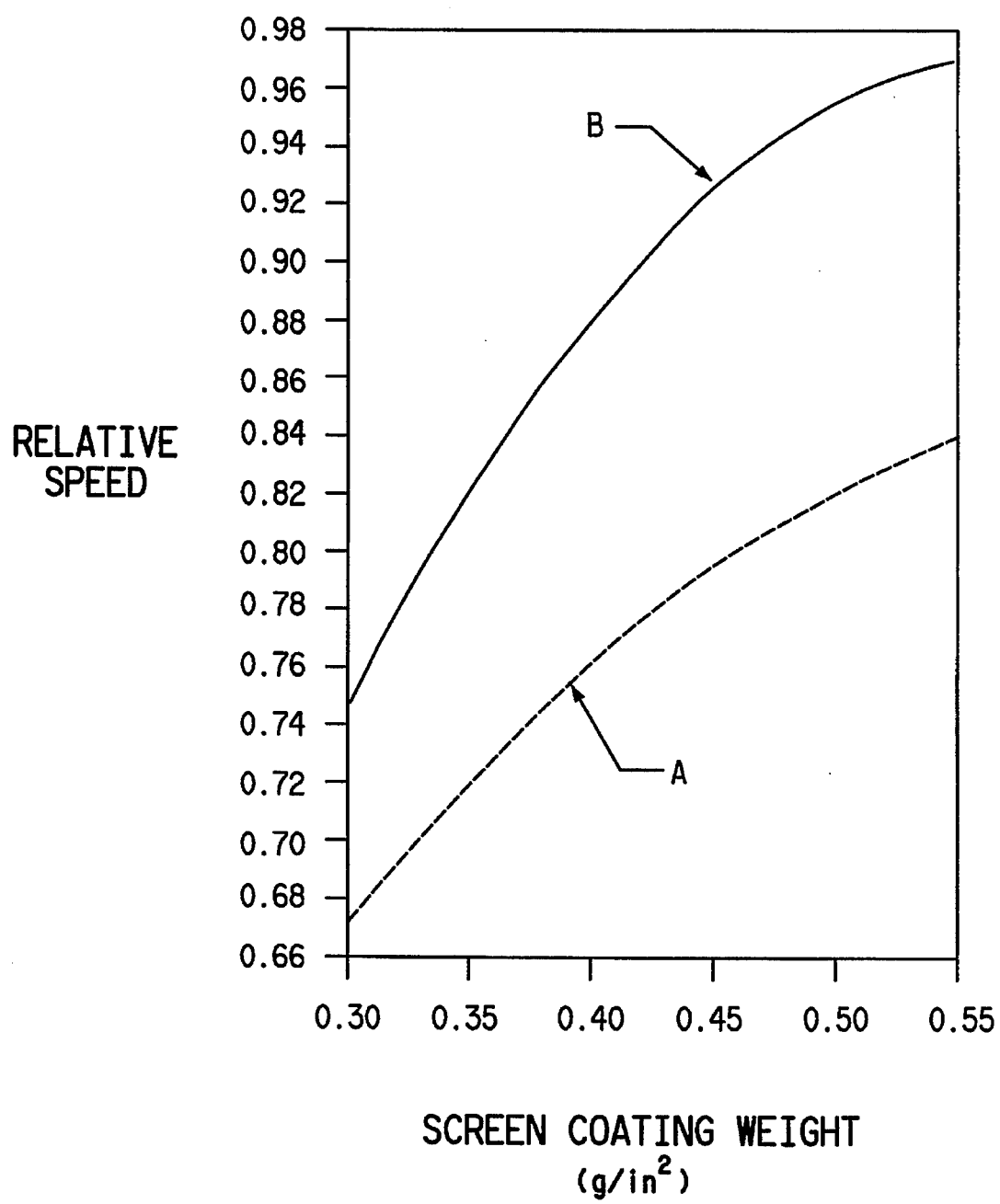
FIG. 1 is a plot of screen coating weight vs. relative speed of the phosphor prepared using a flux of the prior art, A, and the flux, B, for terbium activated yttrium tantalate.
Figure 2:
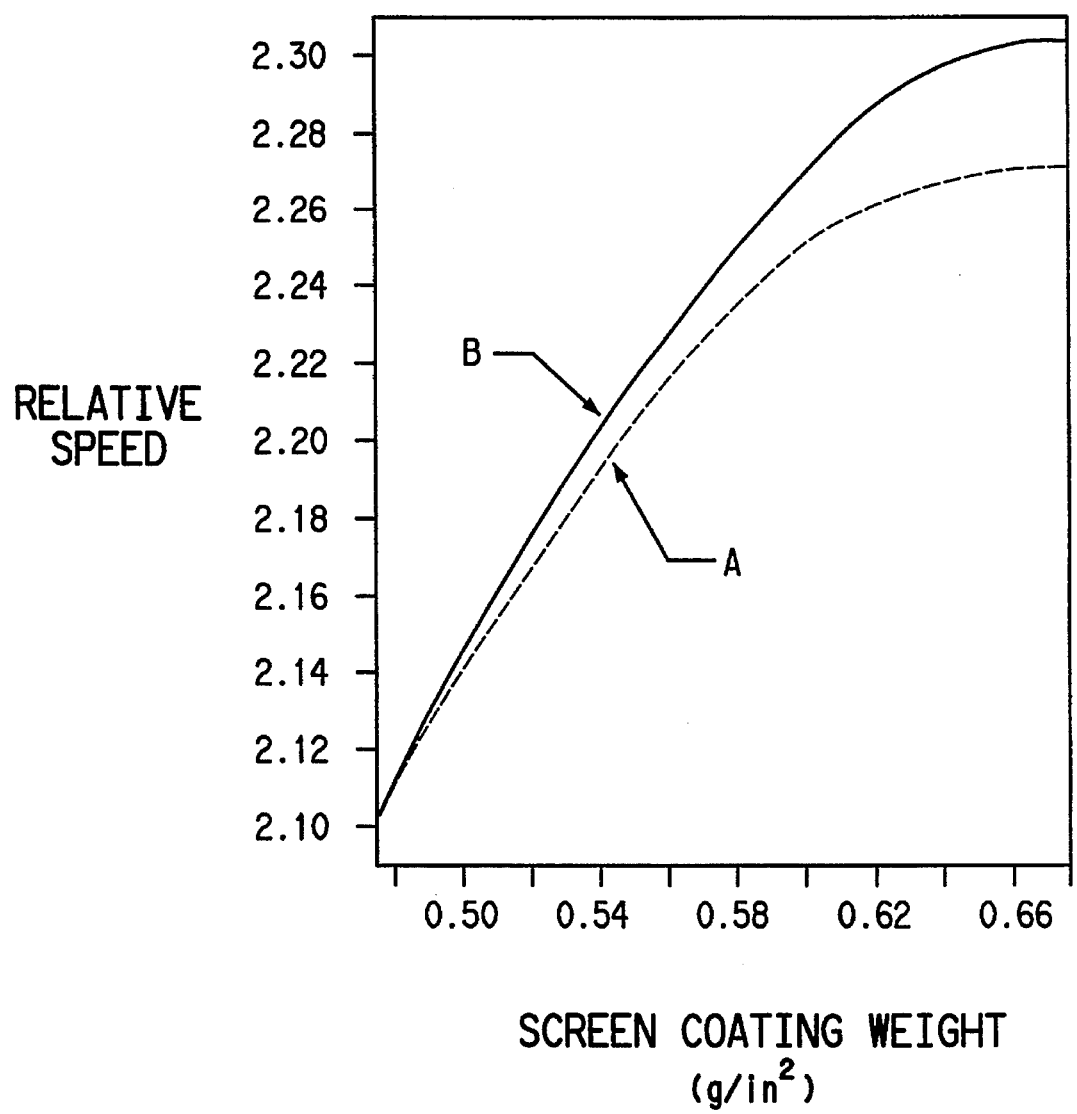
FIG. 2 is a plot similar to FIG. 1 but using thulium activated yttrium tantalate phosphor.
Figure 3:
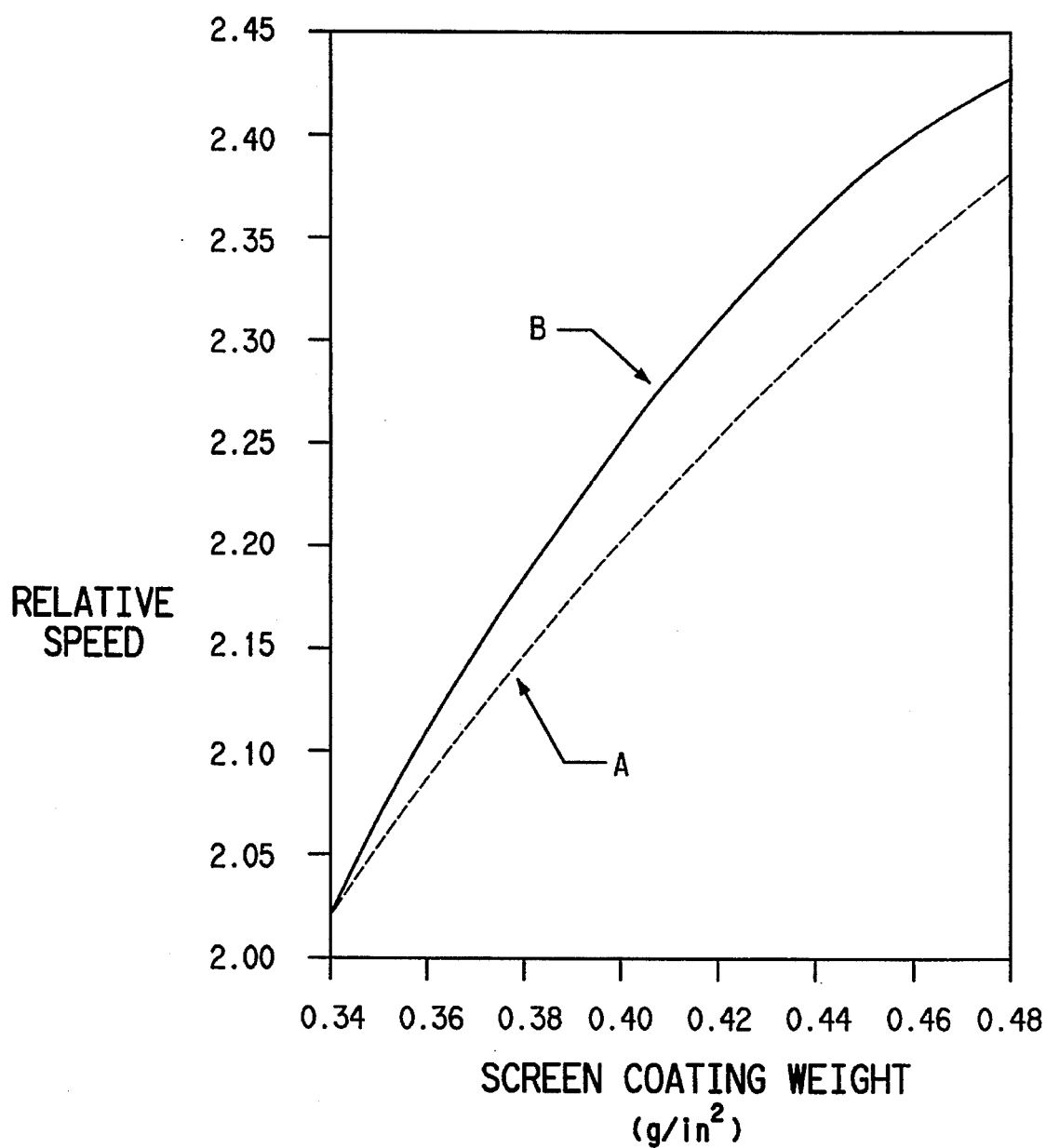
FIG. 3 is a plot similar to FIG. 1 but using niobium activated yttrium tantalate phosphor.

FIG. 1 shows a plot of terbium activated yttrium tantalate phosphor prepared with a standard flux and with a flux containing an effective amount of an alkali metal metasilicate therein. These plots wherein Curve A is the standard, conventionally prepared phosphor and Curve B represents the phosphor prepared by the process described herein are shown in Relative Speed vs. X-ray Screen Coating Weight (gm/in$^2$). FIG. 2 illustrates a plot similar to FIG. 1 for thulium activated yttrium tantalate phosphor, while FIG. 3 shows a similar plot for niobium activated yttrium tantalate phosphor. All of these plots show the improved efficiency that can be obtained using a flux comprising a compound that forms an alkali metal oxide with the addition of a metasilicate.

Figure 4:
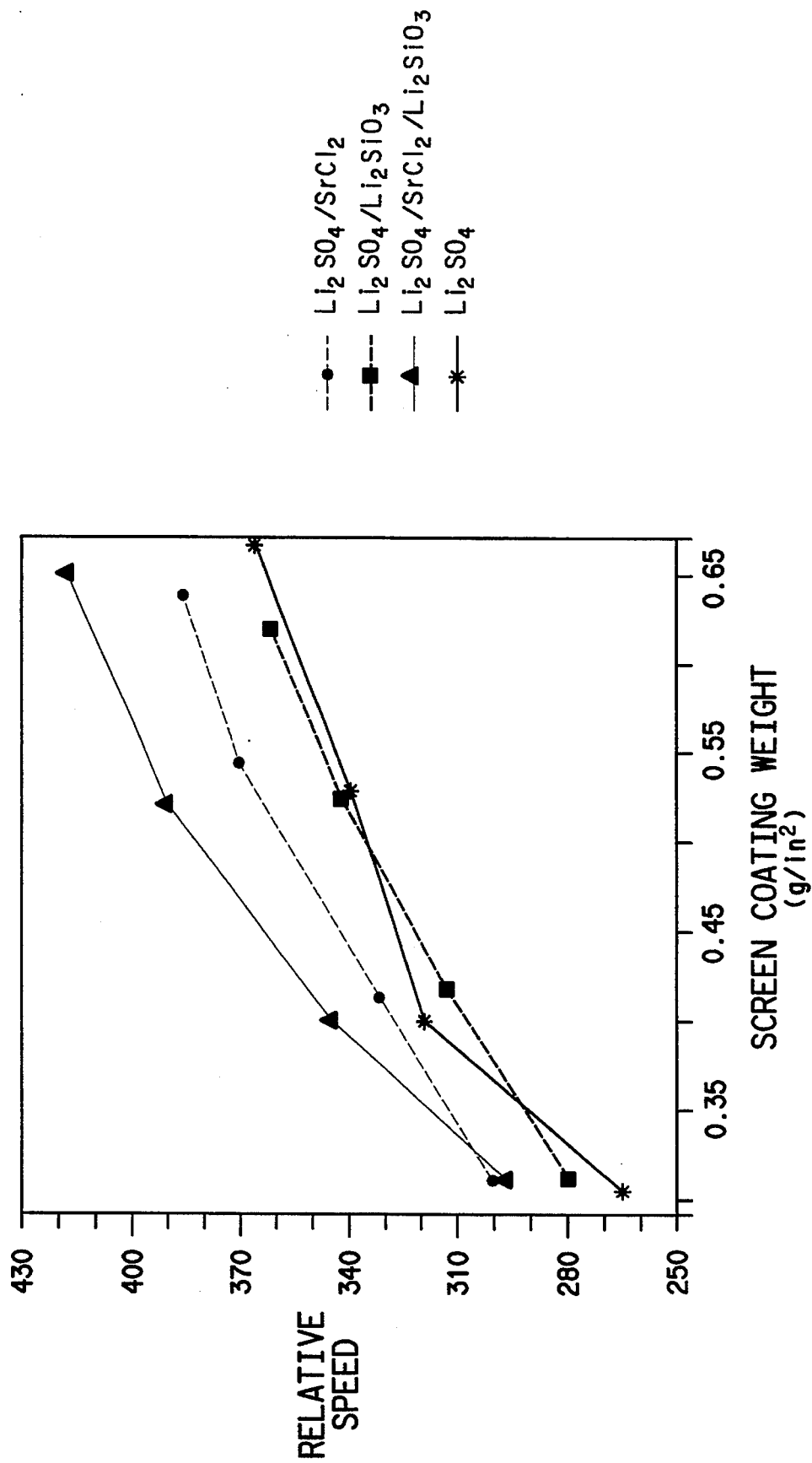
FIG. 4 is a plot of screen coating weight vs. relative speed of phosphors prepared using various fluxes or flux mixtures.

The FIG. 4 shows plots of niobium activated yttrium tantalate phosphor prepared with various fluxes, i.e., lithium sulfate, described in Control 1 below; lithium sulfate with 0.5% by weight replaced by 0.5% by weight lithium metasilicate, described in Control 2 below; lithium sulfate with 5% by weight replaced by 5% by weight strontium chloride, described in Control 3 below; and lithium sulfate with 0.5% by weight replaced by 0.5% by weight lithium metasilicate and 4.5% by weight replaced by 4.5% by weight strontium chloride described in Example 5 below. These plots, wherein the curves represent phosphors prepared using various fluxes and one phosphor prepared by the process disclosed herein, are shown in Relative Speed vs. X-ray Screen Coating Weight (gm/in$^2$). All these plots show the improved efficiency that can be obtained using a flux containing an alkali metal sulfate, an alkali metal or alkaline earth chloride and an alkali metal metasilicate during firing.

While not being limited to any particular theory, the presence of the alkali metal metasilicate is believed to be a critical member of the flux combination to yield the more efficient tantalate phosphors, for example, by the following reaction which occurs during decomposition of an alkali metal sulfate, e.g., $Li_2SO_4$, a common flux used in the preparation of tantalate phosphors.

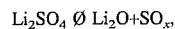

where x is 2 or 3

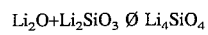

It is believed that the addition of alkali metal metasilicate to the flux sequesters alkali metal oxide which may be formed in the course of the firing reaction. The alkali metal or alkaline earth chloride component of the flux may act as a wetting agent allowing for a more complete reaction of the precursor oxides. The three component mixture is more stable than a combination of chloride fluxes, e.g., lithium and strontium chloride.

The M' monoclinic tantalate phosphors used in this invention are preferably prepared by mixing stoichiometric amounts of the precursor oxides (phosphor starting material) to form an intimate mixture. This blending may be accomplished in a number of conventional ways. For example, the ingredients may be ball-milled or simply shaken together in some sort of blender. The use of a liquid medium to improve the efficiency of the mixing process such as water, fluorochlorinated hydrocarbons or other such inert fluids, may also be incorporated.

The intimate mixture is then mixed with a flux and fired, washed, dried and sieved to recover the desired particle size phosphor. Many fluxes are known for the preparation of phosphors and may be used here to prepare the polyhedral crystals. Because they yield more efficient phosphors, the phosphors are preferably prepared using a flux comprising a component capable of producing an alkali metal oxide, together with an alkali metal metasilicate. There are a host of compounds that are capable of producing an alkali metal oxide, including the alkali metal, e.g., lithium, sodium, potassium, etc., sulfates, carbonates, etc. The alkali metal metasilicate component of the flux is present in an amount of about 0.1% to about 1.0%, preferably about 0.2% to about 0.6% by weight, based on the total weight of phosphor starting material. The total flux is present in the reaction mixture in about 30% to about 60% by weight, preferably about 45% to about 55% by weight, based on the total weight of phosphor starting materials. A particularly preferred flux is $Li_2SO_4/Li_2SiO_3$ for making the polyhedral shaped phosphor crystals.

As an alternative to the above, the intimate mixture may be mixed with a ternary flux comprising an alkali metal sulfate; an alkali metal chloride or an alkaline earth, e.g. strontium, barium, magnesium, calcium, etc., chloride; and an alkali metal metasilicate. The total flux is present in the reaction mixture in about 35% to about 60% by weight, preferably about 45% to about 55% by weight, based on the total weight of phosphor starting material. The alkali metal sulfate is present in about 33.5% to about 48.5% by weight, preferably about 43% to about 46% by weight; the alkali metal or alkaline earth chloride is present in about 1% to about 15% by weight, preferably about 3% to about 6% by weight; and the alkali metal metasilicate is present in an amount of about 0.1% to about 1.5% by weight, preferably about 0.4% to about 0.6% by weight, based on the total weight of phosphor starting material. A particularly preferred flux combination for making polyhedral crystals is $Li_2SO_4/SrCl_2/Li_2SiO_3$ present in an amount of 45%/4.5%/0.5%, respectively, wherein all percentages are by weight based on the total weight of phosphor starting material.

The mixture of phosphor starting materials and flux can be fired for at least about three hours at elevated temperatures, e.g., from 1100° C. to 1400° C., before washing, drying and recovering the phosphor. A preferred temperature range is from 1250° C. to 1300° C.

Figure 5:
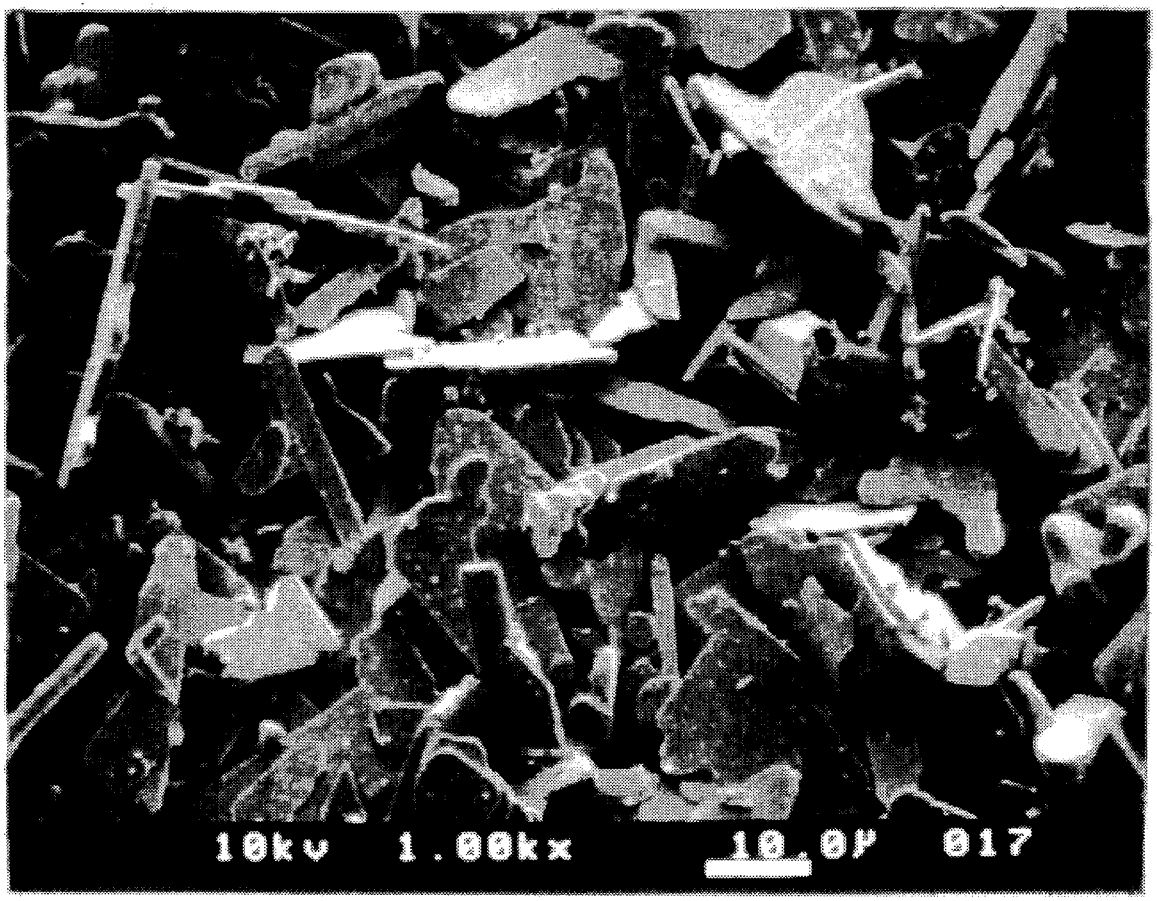
FIG. 5 is a scanning electron micrograph of the tabular phosphor particles usable in the instant invention.
Figure 6:
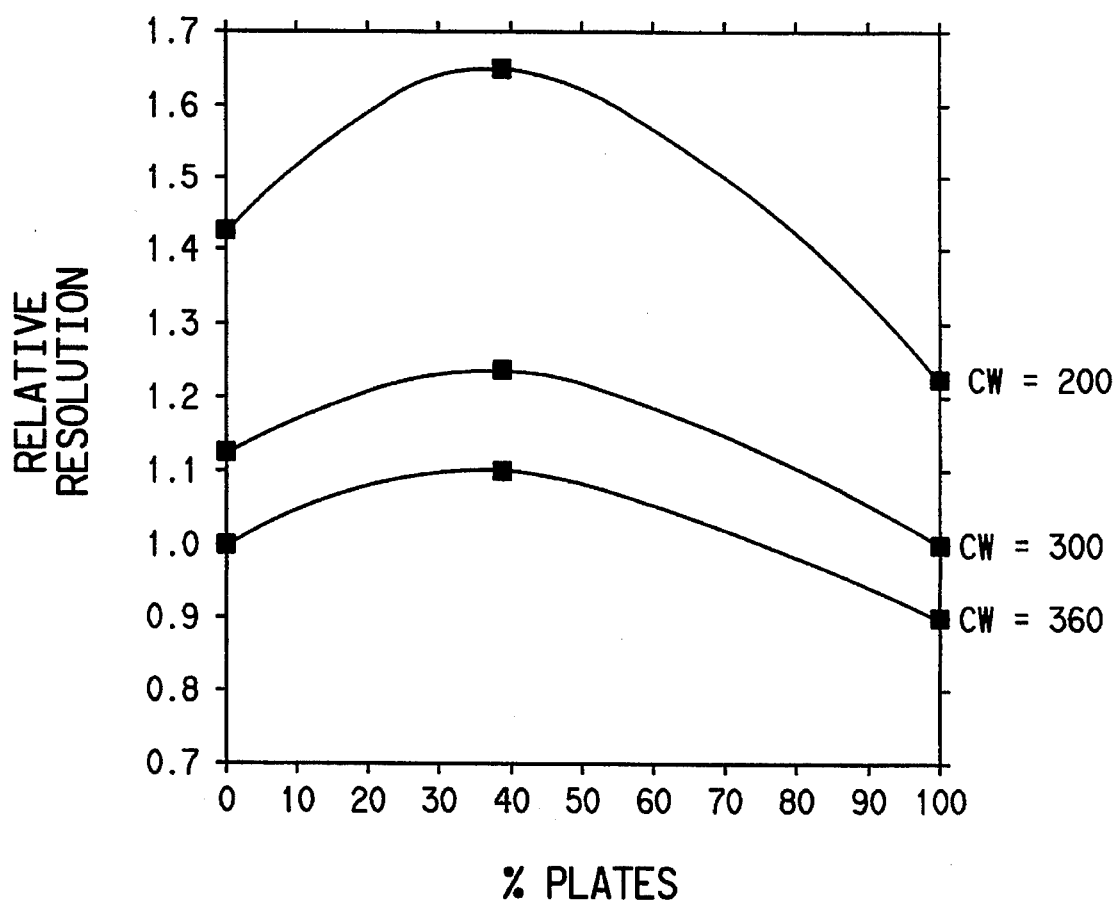
FIG. 6 is a graphical representation demonstrating the effect of tabular phosphor particles intermixed with polyhedral phosphor particles in a medical X-ray intensifying screen.

FIG. 5 shows the tabular phosphor particles as prepared in accordance with the teachings herein. Tabular particles of yttrium tantalate phosphors have not been exploited in the art due in part to the ineffective methods for obtaining such tabular particles. Furthermore, tabular phosphor particles have been taught to be inferior to conventional polyhedral phosphor particles when used alone due to increased light spread. This fact is supported for pure tabular phosphors as illustrated in FIG. 6. A sample containing 100% tabular phosphor is, in every instance, inferior to a sample containing 100% polyhedral phosphor particles. The surprising results of increased resolution at a constant speed is observed when mixtures of tabular and polyhedral phosphors are employed in specific ratios.

Tabular phosphor particles are characterized by two substantially parallel faces. The aspect ratio is defined as the ratio of the diameter to the thickness. The diameter is that of a circle with the same projected area as a parallel face of the tabular phosphor particle. For tabular phosphor particles the aspect ratio is preferably larger than approximately 2:1 although much higher aspect ratios can easily be obtained in the teachings provided.

The tabular phosphors usable in the present invention are preferably prepared using one of the fluxes described above, wherein the alkali metal metasilicate is sodium metasilicate. While not being limited to any particular theory, the presence of the sodium metasilicate is believed to be a critical member of the flux combination for preparing the tabular phosphor utilized in this invention. Sodium metasilicate is believed to retard growth along the c axis of the crystal lattice which is essentially perpendicular to the parallel face of the tabular phosphor particle. Crystal growth is therefore more rapid in the a and b axes of the crystal lattice thereby forming tabular phosphor particles. The monoclinic unit cell lattice parameters are essentially identical for the polyhedral and tabular phosphor crystals.

The total flux is present in the reaction mixture in about 30% to about 60% by weight, preferably about 45% to about 55% by weight, based on the total weight of phosphor starting material. The sodium metasilicate component of the flux is present in an amount of about 0.1% to about 10%, preferably about 0.5% to about 2% by weight, based on the total weight of phosphor starting material.

The mixture of phosphor starting materials and flux can be fired, e.g., for at least about three hours, at elevated temperatures of about from 1100° C. to 1400° C., before washing, drying and recovering the phosphor. A preferred temperature range is from 1250° C. to 1300° C.

After the intensifying phosphor is made according to the teachings herein, predetermined ratios of tabular and polyhedral phosphor particles are intimately mixed as known in the art. The phosphor mixture may be dispersed in any of the commonly known binders, e.g., polyvinyl butyral or the acrylates or methacrylates, using a solvent, e.g., an alcohol, chlorinated hydrocarbon, ketone, butyl acetate, etc. Small amounts of fumed silica may be present in the phosphor to enhance handling and make the phosphor easier to pour. After dispersing in the binder, the phosphor is then cast on a conventional support, e.g., cardboard, polyester film, thin metal sheets, etc. A brightener may also be present within the phosphor and various reflective materials may be present as an underlayer or within the support itself to enhance the generation of light when the phosphor is struck by X-radiation. Anatase $TiO_2$ dispersed in a binder and cast on the support is conventional as well as the use of small particles of rutile $TiO_2$ directly in a film support. All of these procedures are well-known in the art.

Over the phosphor layer which has been cast on the support, a conventional protective topcoat may be applied and, in fact, is preferred. These topcoats are also well-known in the prior art and serve to protect the rather expensive phosphor layer from stains and defects during the handling thereof. Conventional supports, binders, mixing and coating processes for the manufacture of typical X-ray intensifying screens are, for example, described in Patten, U.S. Pat. No. 4,387,141, the pertinent disclosure of which is incorporated herein by reference thereto.

It is conventional to use X-ray intensifying screens in pairs in cooperation with double-side coated medical X-ray silver halide photographic film elements, although it is sometimes common to use single-side coated silver halide photographic film elements for some applications. A pair of screens is conventionally used and the coating weights of each screen may be different, if required. Thus, an asymmetric pair of screens can be used to get the best results. Medical X-ray evaluations represent the predominant commercial use for X-ray intensifying screens of this invention. A dimensionally stable, polyethylene terephthalate film support into which small amounts of rutile or anatase $TiO_2$ have been incorporated is the preferred support for the X-ray intensifying screen of this invention.

A preferred embodiment of the invention for medical X-ray intensifying screens comprises 5–80% tabular phosphor and 20–95% polyhedral phosphor particles. At levels of tabular phosphor content above about 80%, the properties of the eventual screen are inferior to screens with 100% polyhedral phosphors. At levels of tabular phosphor content below about 5%, the eventual screen closely resembles a conventional screen and no added benefit is provided by the tabular phosphor particles. More preferred is a medical X-ray intensifying screen which incorporates a phosphor comprising 20–50% tabular phosphor particles and 50–80% polyhedral phosphor particles. Most preferred is a medical X-ray intensifying screen incorporating a phosphor comprising 30–40% tabular phosphor particles and 60–70% polyhedral phosphor particles. Preferred are medical x-ray intensifying screens wherein the tabular and polyhedral phosphor has substantially identical composition although mixed tantalates are also usable.

EXAMPLES

The following specific examples illustrate the improved efficiency of the tantalate phosphors when using a flux as described above and the improved resolution of an X-ray intensifying screen utilizing such phosphors wherein a portion of the phosphors are tabular. The first group of examples illustrates the improved phosphor obtained by using a flux comprising a compound that decomposes to form an alkali metal oxide together with a metasilicate. Unless otherwise stated, all of the percentages and parts expressed in the examples are by weight.

EXAMPLE 1

A mixture of 1 mole of tantalum oxide, 0.997 mole yttrium oxide and 0.003 mole of terbium oxide were thoroughly blended with a mixture of 49.5% of lithium sulfate and 0.5% of lithium metasilicate. The flux is present in an amount of 50% based on the total weight of oxide. This mixture was then fired at 1290° C. in air for 12 hours. The lithium salts were then washed from the resultant phosphor with deionized water. After drying, the phosphor was treated by the addition of 0.0002 gm of fumed silica per gm of phosphor to improve the flowability thereof. The phosphor is then dispersed by ball-milling 100 gm of the phosphor in 6 gm of a carboxylated methyl methacrylate acrylic binder with 1 gm of a mixture of a block copolymer of polyoxyethylene and polypropylene glycol, a plasticizer, and dioctyl sodium sulfosuccinate, wetting agent, using a solvent mixture of a 1 to 1 weight mixture of n-butyl acetate and n-propanol. This suspension was coated on 0.010 inch (0.25 mm) polyethylene terephthalate with about 5 mg/cm$^2$ TiO$_2$ dispersed therein. The dispersion was coated at various coating weights and the effect on speed tested by exposure to an X-ray source at 70 kVp and 5 mas at a photographic X-ray film to X-ray tube distance of 130 cm. Relative speeds obtained are shown in Curve B of FIG. 1. For control purposes, a similar screen was made using only a lithium sulfate salt as the flux. The relative speed results are shown by Curve A of FIG. 1. These results show that the phosphor prepared with the flux of this invention will have higher relative speed than that prepared with a single, conventional flux.

EXAMPLE 2

A mixture of 1 mole of tantalum oxide, 0.997 mole of yttrium oxide and 0.003 mole of thulium oxide were blended with the same flux described in Example 1 using the same conditions. Screens were made by coating the washed and dried phosphor on the support described in Example 1. Samples at various coating weights were tested by exposure to photographic films also as described in Example 1. The results, for the phosphor of this invention are shown in Curve B. In Curve A the results of a control using a standard, single flux, are plotted.

EXAMPLE 3

Another sample of phosphor was prepared in the same manner as described in Example 1. This phosphor was prepared from 0.98 mole of tantalum oxide, 0.02 mole of niobium oxide and 1 mole of yttrium oxide. After firing, washing, drying, blending with a binder and coating at various coating weights on a support, samples of the coatings were used to expose photographic films. The results are shown in FIG. 3 as Curve B while that of a control using a standard, single flux, made at the same time as the invention phosphor is plotted as Curve A.

EXAMPLE 4

A mixture of 678.2 gm yttrium oxide, 1313.8 gm tantalum oxide and 8.0 gm niobium oxide were mixed in a vibrorotary mill using alumina cylinders and Freon® TF, E. I. du Pont de Nemours and Co., Wilmington, Del., as the milling fluid. The oxide mixture was dried and combined with a flux mixture consisting of 950 gm lithium sulfate and 50 gm lithium metasilicate. As a control, a 2000 gm mixture of oxides was blended with 1000 gm of lithium sulfate. These mixtures were placed in high purity alumina crucibles, heated to 1290° C. and held at this temperature for 12 hours. After the crucibles had cooled to near room temperature, the fired masses were removed from the crucibles and washed with deionized water until the water tested free of lithium sulfate. The water was removed by filtration and the phosphors were dried. The phosphors were dispersed in a solution of acrylic polymers, wetting agents and solvent as described in Example 1. The phosphor dispersions were coated on reflective substrates so as to give X-ray intensifying screens with various coating weights. The screens were exposed to X-rays as described above and the following results were obtained as shown in Table I below.

TABLE I

| Screen Coating Weight | Screen Speed for Various Fluxes | |
|---|---|---|
| | Lithium Sulfate | Lithium Sulfate/ Lithium Metasilicate |
| 0.4 gm/sq in | 1.00 | 1.01 |
| 0.5 gm/sq in | 1.08 | 1.14 |
| 0.6 gm/sq in | 1.10 | 1.24 |

As can be seen from these results, the addition of an alkali metasilicate to the flux results in higher phosphor efficiency, which will mean lower exposure of patients to X-radiation.

This next group of examples illustrates the improved phosphors obtained using a ternary flux comprising an alkali metal sulfate, an alkali metal or alkaline earth chloride and an alkali metal metasilicate.

CONTROL 1

Yttrium oxide, niobium oxide and tantalum oxide in the molar ratios 1 to 0.005 to 0.995, respectively, were milled together to deagglomerate and mix the constituents. This mixture was then combined with lithium sulfate present in an amount of 50% based on the total weight of oxide and fired for 12 hours at 1290° C. Following removal of the lithium sulfate flux by washing with water, the phosphor is then dispersed by ball-milling 100 gm of the phosphor in 6 gm of a carboxylated methyl methacrylate acrylic binder with 1 gm of a mixture of a block copolymer of polyoxyethylene and polypropylene glycol, a plasticizer, and dioctyl sodium sulfosuccinate, wetting agent, using a solvent mixture of a 1 to 1 weight mixture of n-butyl acetate and n-propanol. This suspension was coated on 0.010 inch (0.25 mm) polyethylene terephthalate with about 5 mg/cm$^2$ TiO$_2$ dispersed therein. At a coating weight of 0.65 g/sq. in., the speed of the phosphor was found to be 2.70 times that of a commercial HiPlus X-ray intensifying screen, E. I. du Pont de Nemours and Company, Wilmington, Del.

To make comparison of other examples and controls to this control more apparent, the speed of Control 1 will be considered to be 1.00 at a coating weight of 0.65 g/sq.in. The speeds of the following phosphors will be compared to this control.

CONTROL 2

Phosphor was prepared as described in Control 1 but 0.5% of the lithium sulfate was replaced by 0.5% lithium metasilicate. The resultant phosphor gave a speed of 1.02, an improvement over that of the phosphor of Control 1. The increased phosphor efficiency demonstrates the improvement resulting from the addition of a small amount of sequesterant to minimize the influence of lithium sulfate decomposition products on the phosphor.

CONTROL 3

Phosphor was prepared as described in Control 1 but 5% of the flux was replaced by 5% strontium chloride. The resulting phosphor gave a speed of 1.08, an improvement over that of the phosphor of Control 1. The higher phosphor speed demonstrates the fact that halides improve the reaction between yttrium oxide and tantalum and niobium oxides.

EXAMPLE 5

Phosphor was prepared as described in Control 1 but with the substitution of 0.5% of the lithium sulfate by lithium metasilicate and substitution of an additional 4.5% of lithium sulfate by strontium chloride. The resulting phosphor had a speed of 1.16, a substantial improvement over that of the phosphor of Control 1. This speed is surprising since if the effect of lithium metasilicate and strontium chloride are simply additive, a speed of 1.10 should be obtained. The further improvement in speed suggests an unexpected synergistic influence from combining the alkali metal metasilicate with the chloride.

EXAMPLE 6

A 13 kg batch of yttrium oxide, niobium oxide and tantalum oxide in the molar ratios described in Control 1 were combined in a vibro-rotary media mill. The resulting oxide blend was divided into 5 parts. Each part was blended with 45% lithium sulfate, 0.5% lithium metasilicate and 4.5% of an alkali or alkaline earth chloride based on the total weight of oxides present. The reaction mixes were subjected to firing at 1290° C. for 12 hours. After removal of the soluble salts by washing with water, the phosphors were made into X-ray intensifying screens as described in Control 1 in order to test their efficiency. The following results were obtained:

| Added Chloride | Speed | Coating Weight |
| --- | --- | --- |
| Lithium | 3.10 | .648 |
| Sodium | 3.17 | .638 |
| Potassium | 3.11 | .655 |
| Barium | 3.14 | .642 |
| Strontium | 3.25 | .673 |
| None as Control 1 | 2.70 | .650 |

As these data demonstrate, the effect of adding alkali or alkaline earth chlorides to the reaction mixture results in higher than expected phosphor efficiency, which will result in lower exposure of patients to X-radiation thereby increasing the safety of the imaging process.

The following examples demonstrate the improved resolution of an X-ray screen using a mixed morphology phosphor.

Preparation of tabular M'YTaO$_4$

A 3813 gm mixture of yttrium oxide and tantalum oxide in the molar ratio of 1.00/1.00 was milled to mix and deagglomerate the solids. The solid oxides were mixed with a reaction flux composed of 1811 gm sodium sulfate, 32 gm strontium chloride and 76 gm sodium metasilicate. The mixture was then fired at 1290° C. for 12 hours, washed with deionized water, treated with fumed silica and sieved to give a white, free flowing powder. The reaction yielded 91% based on starting oxides. SEM analysis of the particles indicated irregularly shaped plates with an aspect ratio of approximately 5:1. The average particle size was 2.28 μm with a dry bulk density of 0.77 gm/ml.

Preparation of tabular M'YtaO4:Nb

A 667 gm mixture of yttrium oxide, tantalum oxide and niobium oxide in the molar ratio of 1.000/0.995/0.005 respectively was milled to mix and deagglomerate the solids. The solids were then combined with a flux mixture composed of 317 gm lithium sulfate, 3.3 gm strontium chloride and 13.3 gm sodium metasilicate. The mixture was then fired at 1290° C. for 12 hours, washed with deionized water and treated with fumed silica to give a white, free-flowing powder. The reaction yield is 94% based on starting oxides. Scanning electron microscope analysis of the particles indicated irregularly shaped plates with an average aspect ratio of about 7:1. The average particle size is 9.40 um with a dry bulk density of 2.00 gm/ml.

Preparation of polyhedral M'YTaO$_4$:Nb

A 11 kg mixture of yttrium oxide, tantalum oxide and niobium oxide in the molar ratio of 1.000/0.995/0.005 respectively was milled to mix and deagglomerate the solids. 1.08 kg aliquots of the mixture were combined with the flux mixtures as described in Table II. The mixtures were fired at 1290° C. for 12 hours, washed with deionized water and treated with fumed silica to give a white, free-flowing powder.

TABLE II

PHOSPHOR FLUX MIXTURES AND RESULTING PHOSPHOR CHARACTERISTICS

| Phosphor | Na$_2$SO$_4$ | SrCl$_2$ | Na$_2$SiO$_3$ | APS | DBD | MPH | YLD | AR |
| --- | --- | --- | --- | --- | --- | --- | --- | --- |
| A | 500 | 0 | 0 | 3.70 | 1.33 | Poly | 98 | 1/1 |
| B | 475 | 25 | 0 | 3.25 | 1.23 | Poly | 99 | 1/1 |
| C | 475 | 20 | 5 | 3.75 | 1.24 | Tab | 94 | 4/1 |
| D | 475 | 5 | 20 | 2.88 | 1.19 | Tab | 79 | 6/1 |
| E | 475 | 0 | 25 | 3.00 | 1.06 | Tab | 60 | 6/1 |
| F | 450 | 50 | 0 | 2.40 | 1.29 | Poly | 100 | 1/1 |
| G | 450 | 45 | 5 | 3.65 | 1.03 | Tab | 96 | 2/1 |
| H | 450 | 25 | 25 | 2.65 | 1.07 | Tab | 63 | 6/1 |

TABLE II-continued

PHOSPHOR FLUX MIXTURES AND
RESULTING PHOSPHOR CHARACTERISTICS

| Phosphor | $Na_2SO_4$ | $SrCl_2$ | $Na_2SiO_3$ | APS | DBD | MPH | YLD | AR |
|---|---|---|---|---|---|---|---|---|
| I | 450 | 5 | 45 | 2.05 | 0.94 | Tab | 16 | 6/1 |
| J | 450 | 0 | 50 | 2.50 | 1.02 | Tab | 40 | 10/1 |

All weights are in grams; APS represents Average Particle Size (μm); DBD represents Dry Bulk Density (gm/ml); MPH represents Morphology were Poly is polyhedral and Tab is Tabular; YLD is reaction yield; AR represents the Aspect Ratio as determined from scanning electron micrographs and defined herein.

Screen preparation

Phosphor blends were prepared using a tabular phosphor prepared using the flux composition of sample D from the above example and a polyhedral phosphor K which was prepared identical to A above with the exception of a $Li_2SO_4$ flux replacing the $Na_2SO_4$ flux. The ratios of tabular to polyhedral phosphor is given in Table III. Each of the blends were milled with an acrylic polymeric binder. The resultant suspension was cast onto a titanium dioxide filled Mylar® film. The samples were coated to predetermined coating weights, as known in the art, and subjected to speed and resolution measurement according to the teachings in Woodroffe, J. Elec. Soc., 1986, V133, N8, PC339. A blue sensitive medical X-ray film was used to demonstrate the teachings herein.

TABLE III

SENSITOMETRIC COMPARISONS FOR
MIXED MORPHOLOGY BLENDS

| Blend | % Tabular | Coating Weight (mg/in²) | Relative Speed | Relative Image Resolution |
|---|---|---|---|---|
| 1 | 0 | 249 | 1.62 | 100 |
| 2 | 0 | 333 | 1.83 | 87 |
| 3 | 0 | 390 | 2.06 | 77 |
| 4 | 25 | 270 | 1.58 | 117 |
| 5 | 25 | 323 | 1.83 | 105 |
| 6 | 25 | 373 | 2.06 | 90 |
| 7 | 50 | 271 | 1.61 | 100 |
| 8 | 50 | 315 | 1.82 | 102 |
| 9 | 50 | 340 | 1.72 | 100 |
| 10 | 50 | 333 | 1.79 | 95 |
| 11 | 50 | 333 | 1.83 | 96 |
| 12 | 50 | 318 | 1.87 | 94 |
| 13 | 50 | 410 | 2.02 | 82 |
| 14 | 75 | 260 | 1.58 | 109 |
| 15 | 75 | 318 | 1.78 | 90 |
| 16 | 75 | 386 | 1.99 | 77 |
| 17 | 100 | 237 | 1.57 | 92 |
| 18 | 100 | 314 | 1.89 | 85 |
| 19 | 100 | 390 | 1.89 | 70 |

Relative speed is versus a standard $CaWO_4$ screen;
Relative Resolution is versus Blend 1 of this table.

Contour plots of the data from Table III were generated for clarity and analysis of optimal tabular to polyhedral ratio. Selected results from the contour are included in Table IV and illustrated in FIG. 6.

TABLE IV

SELECTED RESULTS FROM CONTOUR SURFACE
ANALYSIS OF SENSITOMETRIC DATA

| Blend | % Tabular | Coating Weight (mg/in²) | Relative Speed | Relative Image Resolution |
|---|---|---|---|---|
| TB1 | 0 | 360 | 1.92 | 1.00 |
| TB2 | 39 | 360 | 1.92 | 1.11 |
| TB3 | 100 | 360 | 1.92 | 0.90 |
| TB4 | 0 | 300 | 1.74 | 1.13 |
| TB5 | 39 | 300 | 1.74 | 1.25 |
| TB6 | 100 | 300 | 1.74 | 1.00 |
| TB7 | 0 | 200 | 1.45 | 1.42 |
| TB8 | 39 | 200 | 1.45 | 1.64 |
| TB9 | 100 | 200 | 1.45 | 1.23 |

Relative speed is versus a standard $CaWO_4$ screen;
Relative Resolution is versus Blend TB1 of this table.

The results of Table IV demonstrate that an improvement in relative image resolution is realized when the phosphor comprises a mixture of tabular and polyhedral particles as taught herein. Furthermore, improved image resolution is accomplished without loss in speed.

What is claimed is:
1. A medical X-ray evaluation apparatus comprising: a photographic film element in cooperation with an X-ray intensifying screen comprising a phosphor-binder layer coated on a support, said phosphor-binder layer comprising a binder and a phosphor dispersed therein, said phosphor having the monoclinic M' structure and selected from the group consisting of:

(a) $YNb_xTa_{1-x}O_4$, where x is 0 to about 0.15;
(b) $LuNb_xTa_{1-x}O_4$, where x is 0 to about 0.2;
(c) $Y_{1-y}Tm_yTaO_4$, where y is 0 to about 0.03;
(d) a solid solution of (a) and (b);
(e) a solid solution of (a) and (c);
(f) $Y_{1-y}Tb_yTaO_4$, where y is about 0.001 to about 0.15;
(g) $Lu_{1-y}Tb_yTaO_4$, where y is about 0.001 to about 0.15;
(h) $Gd_{1-y}Tb_yTaO_4$, where y is about 0.001 to about 0.15;
(i) a solid solution of at least two of (f), (g) and (h);
(j) any of (a) to (i) wherein up to 45 mole percent of the yttrium, lutetium or gadolinium is replaced by lanthanum;
(k) any of (a) to (i) wherein up to 15 mole percent the yttrium, lutetium or gadolinium is replaced by ytterbium; and
(l) any of (a), (b), (c), (d) and (e) wherein up to 15 mole percent of the yttrium or lutetium is replaced by gadolinium;

wherein about 5–80% of said phosphor has a tabular morphology with an average aspect ratio of at least 2:1 and the remainder of said phosphor has a polyhedral morphology.

2. A X-ray evaluation apparatus of claim 1 wherein about 20–50% of said phosphor has a tabular morphology.

3. A medical X-ray evaluation apparatus of claim 2 wherein about 30–40% of said phosphor has a tabular morphology.

4. A medical X-ray evaluation apparatus of claim 1 wherein said tabular morphology phosphor has an average aspect ratio of at least 5:1.

5. A medical X-ray evaluation apparatus of claim 1, wherein said polyhedral and tabular morphology phosphors are from the same group (a) through (l) inclusive.

6. A medical X-ray evaluation apparatus of claim 5, wherein said phosphor is $YNb_xTa_{1-x}O_4$, where x is 0 to about 0.15.

7. A medical X-ray evaluation apparatus of claim 1 wherein said polyhedral morphology phosphor and said tabular morphology phosphor are chosen from different groups (a) through (l) inclusive.

8. A medical X-ray evaluation apparatus of claim 7, wherein said tabular morphology phosphor is $YNb_xTa_{1-x}O_4$, where x is 0 to about 0.15.

9. A medical X-ray evaluation apparatus of claim 7, wherein said polyhedral morphology phosphor is $YNb_xTa_{1-x}O_4$, where x is 0 to about 0.15.

* * * * *